(12) United States Patent
Anderson

(10) Patent No.: US 10,343,471 B1
(45) Date of Patent: Jul. 9, 2019

(54) REAR FACING LIGHTING APPARATUS

(71) Applicant: Kent Anderson, Flower Mound, TX (US)

(72) Inventor: Kent Anderson, Flower Mound, TX (US)

( * ) Notice: Subject to any disclaimer, the term of this patent is extended or adjusted under 35 U.S.C. 154(b) by 0 days.

(21) Appl. No.: 15/950,508

(22) Filed: Apr. 11, 2018

Related U.S. Application Data

(60) Provisional application No. 62/484,026, filed on Apr. 11, 2017.

(51) Int. Cl.
| | |
|---|---|
| *B60D 1/36* | (2006.01) |
| *B60R 16/02* | (2006.01) |
| *B60D 1/62* | (2006.01) |
| *B60Q 1/24* | (2006.01) |
| *B60Q 1/30* | (2006.01) |
| *B60D 1/44* | (2006.01) |
| *B60Q 1/00* | (2006.01) |
| *B60Q 1/26* | (2006.01) |

(52) U.S. Cl.
CPC .............. *B60D 1/36* (2013.01); *B60D 1/44* (2013.01); *B60D 1/62* (2013.01); *B60Q 1/0088* (2013.01); *B60Q 1/24* (2013.01); *B60Q 1/2661* (2013.01); *B60Q 1/30* (2013.01); *B60R 16/0207* (2013.01)

(58) Field of Classification Search
CPC ... B60D 1/36; B60D 1/44; B60D 1/62; B60D 1/42; B60Q 1/2661; B60Q 1/0088; B60Q 1/24; B60Q 1/30; B60R 16/0207
See application file for complete search history.

(56) References Cited

U.S. PATENT DOCUMENTS

| | | | | |
|---|---|---|---|---|
| 6,007,033 A * | 12/1999 | Casson | ................ | B60D 1/485 248/224.7 |
| 6,079,136 A * | 6/2000 | Kozlarek | ............... | G09F 13/04 224/519 |
| 6,357,899 B1 * | 3/2002 | Craven | ................ | B60Q 1/2661 362/485 |
| 6,502,845 B1 * | 1/2003 | Van Vleet | ............. | B60D 1/155 280/491.1 |
| 6,655,822 B1 * | 12/2003 | Sylvester | ............ | B60Q 1/2661 362/485 |
| 7,889,062 B1 * | 2/2011 | Albisa | ..................... | B60D 1/52 280/501 |
| 9,434,225 B1 * | 9/2016 | Corsaut | .................. | B60D 1/64 |
| 2012/0320620 A1 * | 12/2012 | Bosarge | ............. | B60Q 1/2661 362/546 |

* cited by examiner

*Primary Examiner* — Evan P Dzierzynski
(74) *Attorney, Agent, or Firm* — Eldredge Law Firm, LLC; Richard Eldredge; Beth Felix

(57) ABSTRACT

A rear facing lighting apparatus attaches to the hitch mounting structure of a vehicle and illuminates that area behind the vehicle. The apparatus has as lighting fixture attached to an adjustment bar that fits inside a mount support. The adjustment bar has holes that accommodate a pin that attaches the bar to the support and allows for repositioning the light. There is also a wire harness to connect a light to the power system of the vehicle.

2 Claims, 6 Drawing Sheets

FIG. 4

REAR FACING LIGHTING APPARATUS

BACKGROUND

1. Field of the Invention

The present invention relates generally to towing systems, and more specifically, to a rear facing lighting apparatus for illuminating the area behind a vehicle in the proximity of a trailer hitch.

2. Description of Related Art

Towing systems are well known in the art and are effective means to pull a trailer behind a vehicle. For example, FIG. 1 depicts a conventional ball hitch device 101 having a mounting bar 103 that attaches to a vehicle. The device 101 also having a ball hitch 105 attached to height adjustment leg 109 via a nut 107. The adjustment leg 109 is attached to the mounting bar 103. Once attached to a vehicle, a trailer it attached to the ball hitch 105 and the trailer is towed behind the vehicle.

One of the problems commonly associated with device 101 is its limited use. For example, trailers are attached to vehicles in various conditions including in places with limited visibility such as night, garages and the like; causing difficulties in attaching the trailer to the ball hitch 105.

Accordingly, although great strides have been made in the area of ball hitch devices 101, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
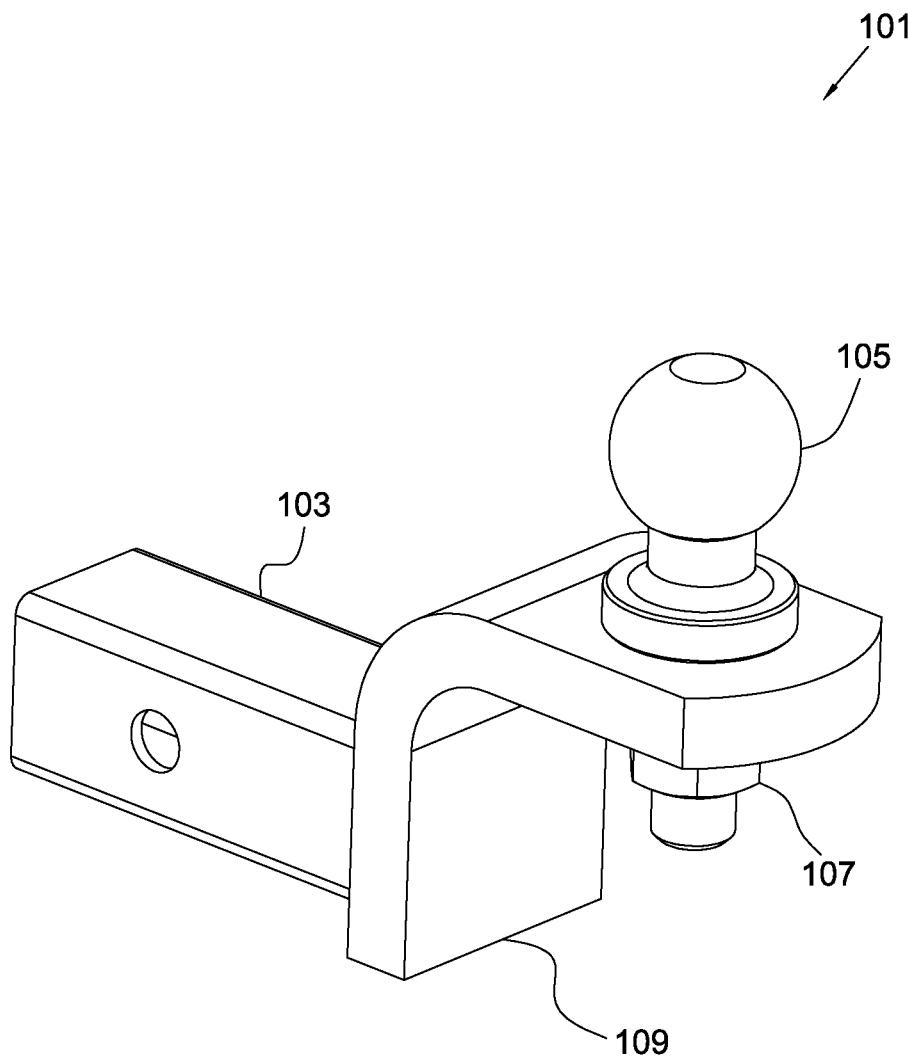
FIG. 1 is a perspective view of a common ball hitch device.

While the apparatus and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the apparatus and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The apparatus and method of use in accordance with the present application overcomes one or more of the above-discussed problems commonly associated with conventional ball hitch devices. Specifically, the apparatus of the present application facilitates a trailer being attached to a vehicle in low light conditions. In addition, the apparatus can be used while the hitch is in use and not. These and other unique features of the apparatus and method of use are discussed below and illustrated in the accompanying drawings.

The apparatus and method of use will be understood, both as to its structure and operation, from the accompanying drawings, taken in conjunction with the accompanying description. Several embodiments of the apparatus are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
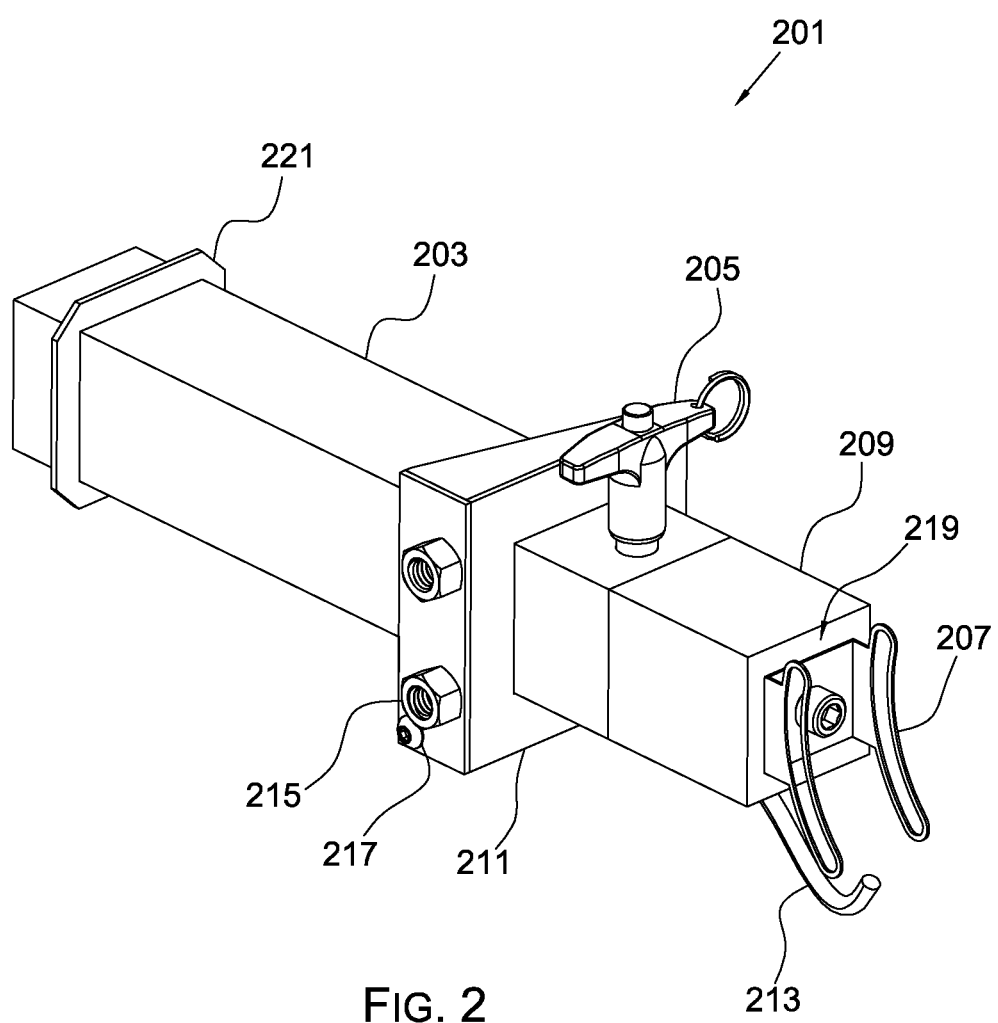
FIG. 2 is a perspective view of a rear facing lighting apparatus in accordance with a preferred embodiment of the present application.

Referring now to the drawings wherein like reference characters identify corresponding or similar elements throughout the several views, FIG. 2 depicts a perspective view of a rear facing lighting apparatus in accordance with a preferred embodiment of the present application. It will be appreciated that apparatus 201 overcomes one or more of the above-listed problems commonly associated with conventional ball hitch devices.

In the contemplated embodiment, apparatus 201 includes a hitch mount support 203 removably attached to an adjustment bar 209 via pin 205 to enable lighting to be available behind a vehicle.

The hitch mount support 203 having a stopping plate 211 rigidly attached. The stop plate 211 including a plurality of fasteners 215 for attaching the apparatus 201 to a vehicle. The support 203 also having a positioning brace 221 that surrounds the support and stabilizes the apparatus 201 when attached to a vehicle.

The adjustment bar 209 having a lighting fixture 207 attached at its far end 219. The bar 209 also having a wire harness 213 attached that is connected to the vehicle's power system via fastener 217.

Figure 3:
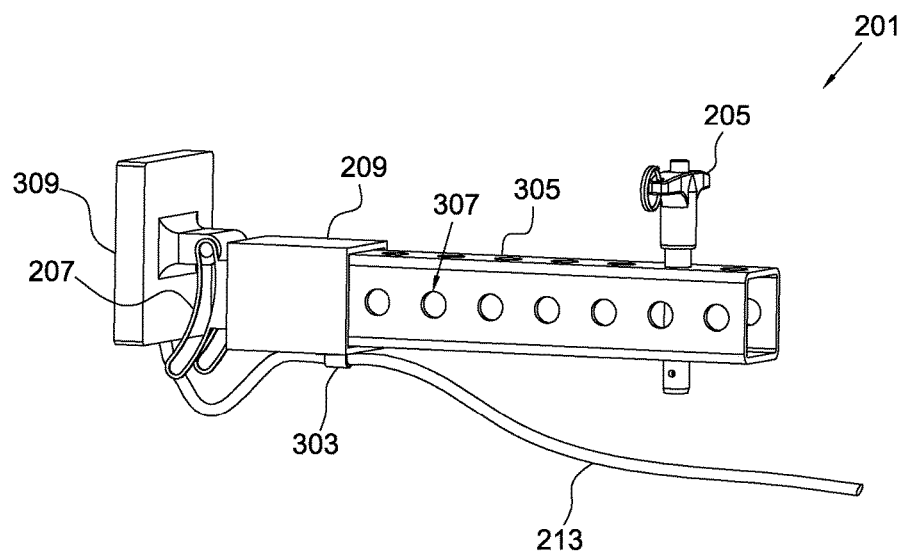
FIG. 3 is a perspective view of the apparatus of FIG. 2.

Referring now to FIG. 3 the fixture 207 is depicted having a light 309 attached. The bar 209 also having a body 305 that is configured to fit inside the hitch mount support 203. The body 305 having a plurality of holes 307 that penetrate though both sides of the body and allow pin 205 to pass there through.

The wire harness 213 is also depicted being attached to the bar 209 via clip 303. The clip 303 is attached to the bar via fastener 217. It will be appreciated that clip 303 and fastener 217 are given as examples of attaching a wire harness 213.

It should be appreciated that one of the unique features believed characteristic of the present application is that adjustment bar 209 and fixture 207 enable a light 309 to be used without occupying the features of a vehicle intended for towing a trailer. It will also be appreciated that having light 309 available facilitates other common features involved with joining a trailer to a vehicle such as review cameras, trailer preparations and making the electrical connections between the vehicle and trailer. It will further be appreciated that light 309 could be used without a trailer or hitch such as working or camping in low light conditions.

Figure 4:
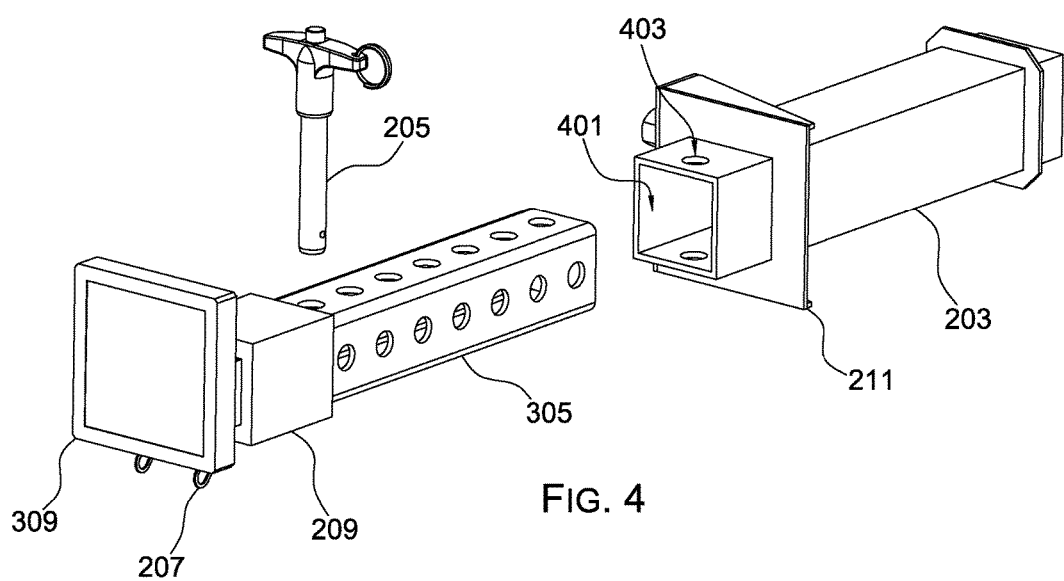
FIG. 4 is an exploded view of the apparatus of FIG. 2.

Referring now to FIG. 4 it will be understood that hitch mount support 203 includes a generally a hollow tube 401 with a hole 403 that penetrates both sides of tube 401 and is configured to all pin 205 to pass there through. The mount support 203 is capable of allowing adjustment bar 209 to extend outwards to reposition light 309. It will be understood that the holes 307, pin 205 and hole 403 enable the adjustment bar 209 to be secured on various positions relative to the support mount 203.

Figure 5:
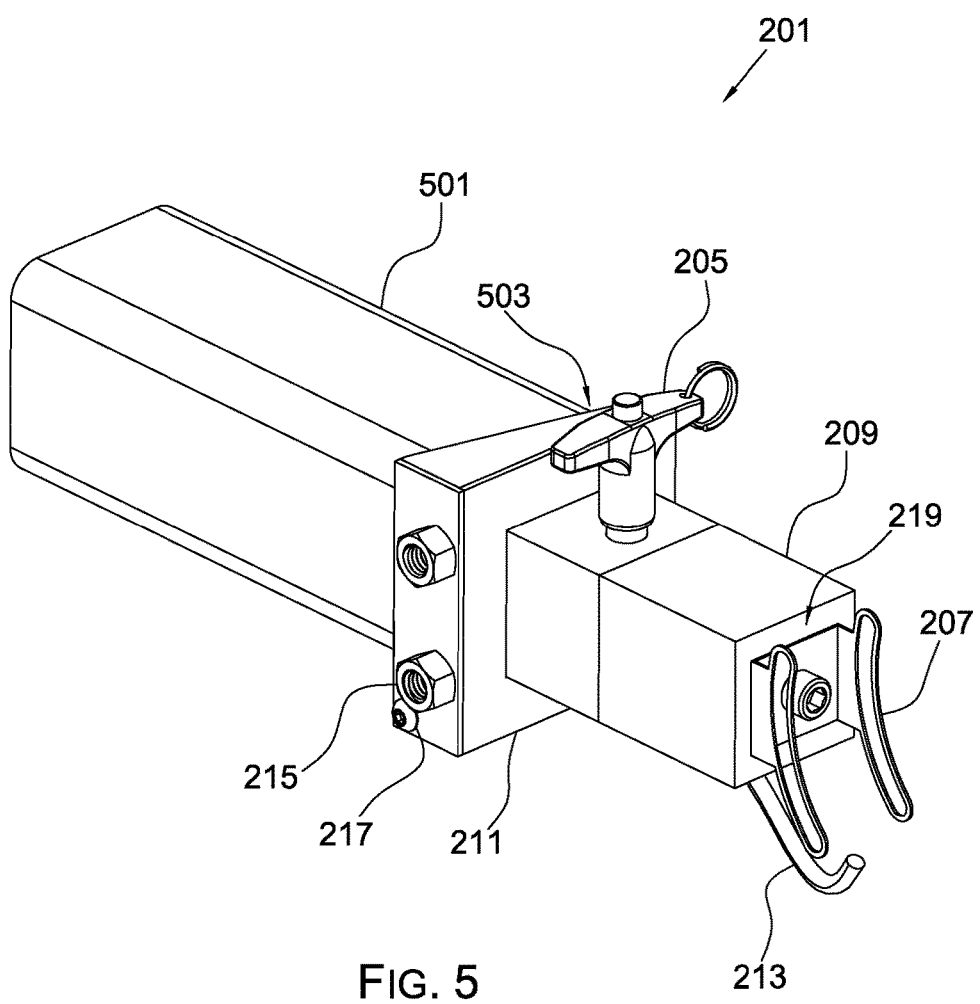
FIG. 5 is a perspective view of the apparatus of FIG. 2 in use.

Referring now to FIG. 5 the apparatus 201 is depicted being attached to a vehicle via a hollow member 501 that is rigidly attached to the vehicle. It will be appreciated that positioning brace 221 prevents the support 203 from moving while inside member 501 by nesting with the interior surfaces. It will also be appreciated that stopping plate 211 in placed against the far end 503 of the member 501 and fasteners 215 are tightened to attach the apparatus 201 to the vehicle.

Figure 6:
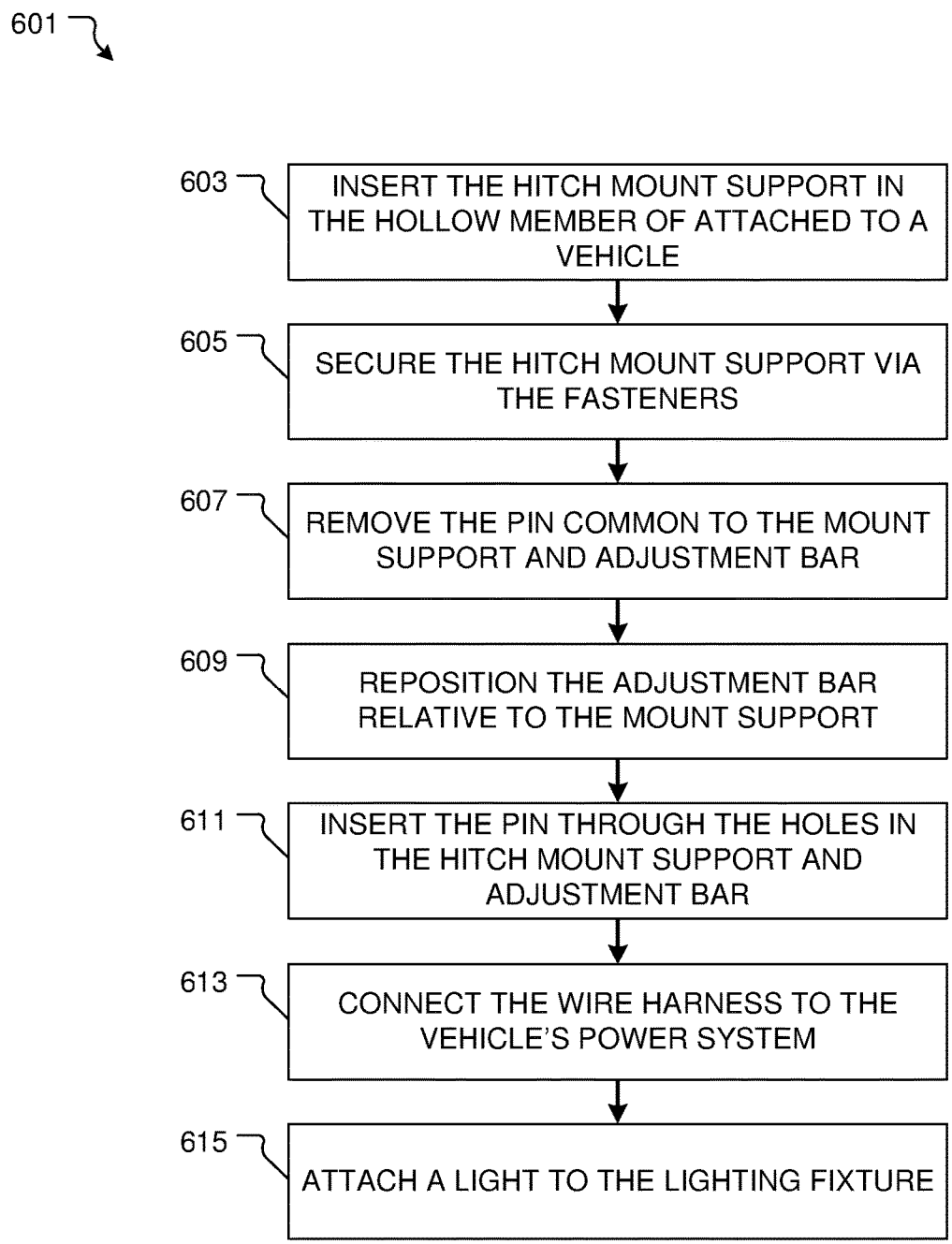
FIG. 6 is a flow chart of the preferred method of use do the apparatus of FIG. 2.

Referring now to FIG. 6 the preferred method of use of the apparatus 201 is depicted. Method 601 including inserting the hitch mount support in the hollow member of attached to a vehicle 603, securing the hitch mount support via the fasteners 605, removing the pin common to the mount support and adjustment bar 607, repositioning the adjustment bar relative to the mount support 609, inserting the pin through the holes in the hitch mount support and adjustment bar 611, connecting the wire harness to the vehicle's power system 613 and attaching a light to the lighting fixture 615.

Figure 7:
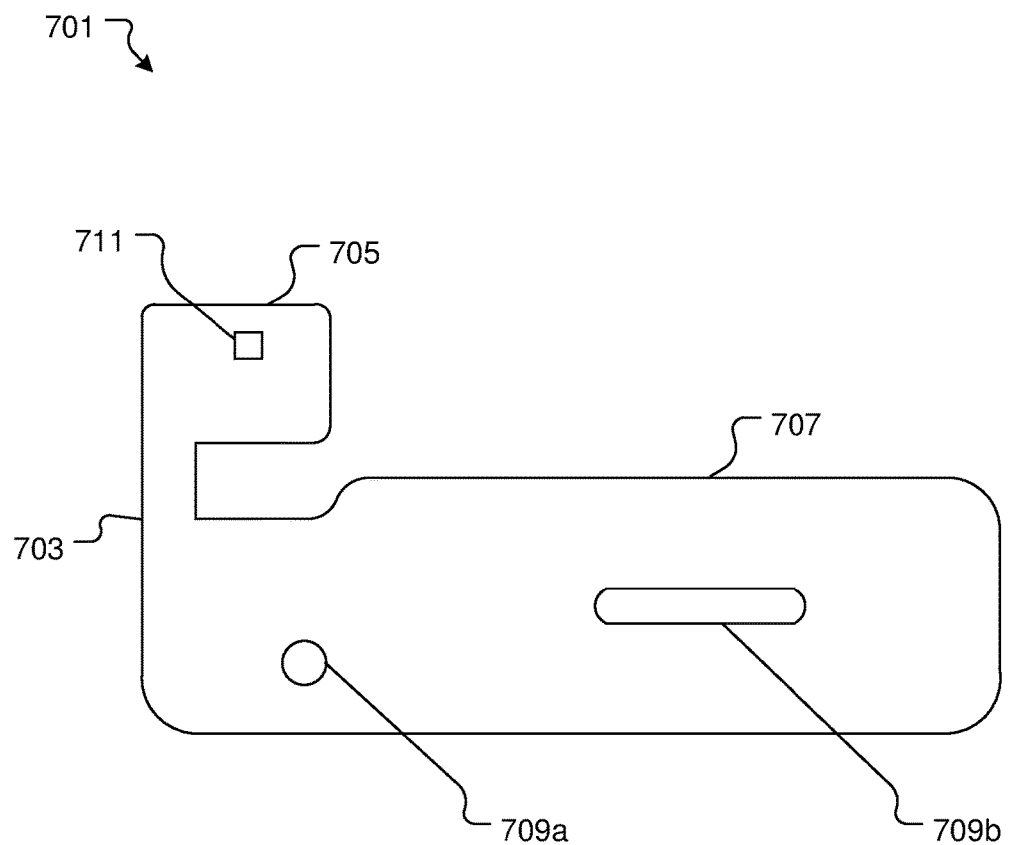
FIG. 7 is front view of an alternative embodiment of the mount support of FIG. 2.

Referring now to FIG. 7 an alternative embodiment of the hitch mount support 203 is depicted. Embodiment 701 including a body 703 having a hitch tab 705 and light mount 707 attached and generally forming a U shape. In use, the hitch tab 705 enters the support structure of the vehicle and is held in place by a fastener passing through penetration 711. A light is attached via penetrations 709.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A rear facing lighting apparatus comprising:
   an adjustment bar removably attached to a hitch mount support,
   the adjustment bar having:
      a body with one or more holes that penetrate both sides of the body and is configured to allow a pin to pass there through, the body is configured to slide within an opening of the hitch mount support and selectively extend thereout by selective placement of the pin within one of the one or more holes;
      a lighting fixture attached a far end of the adjustment bar and configured to attach to a light; and
      a wire harness attached to the body and configured to provide power to the light;
   the hitch mount support having:
      a stopping plate extending around an entire periphery of the adjustment bar; and
      at least one fastener connected to an exterior of the stopping plate, the at least one fastener configured to tighten to secure the stopping plate to the hitch mount support.

2. The method of lighting the area behind a vehicle comprising:
   providing the rear facing lighting apparatus of claim 1;
   repositioning the adjustment bar relative to the mount support;
   inserting the pin through the holes in the hitch mount support and adjustment bar;
   connecting the wire harness; and
   attaching a light to the lighting fixture.

* * * * *